United States Patent [19]

Nelson

[11] 4,453,745

[45] Jun. 12, 1984

[54] LOCKDOWN MECHANISM FOR WELLHEAD CONNECTOR

[76] Inventor: Norman A. Nelson, P.O. Box 1473, Houston, Tex. 77001

[21] Appl. No.: 301,531

[22] Filed: Sep. 14, 1981

Related U.S. Application Data

[63] Continuation-in-part of Ser. No. 293,281, Aug. 17, 1981.

[51] Int. Cl.³ .................. F16L 55/00; F16L 39/00; F16L 25/00
[52] U.S. Cl. ................................ 285/18; 285/321; 285/381; 285/DIG. 21
[58] Field of Search .......... 285/381, 321, 18, DIG. 21

[56] References Cited

U.S. PATENT DOCUMENTS

| | | | |
|---|---|---|---|
| 3,114,566 | 12/1963 | Coberly et al. | 285/18 |
| 3,321,217 | 5/1967 | Ahlstone | 285/18 |
| 3,325,190 | 6/1967 | Eckert et al. | 285/18 |
| 3,675,713 | 7/1972 | Watkins | 285/18 X |
| 4,057,267 | 11/1977 | Jansen | 285/18 |
| 4,124,231 | 11/1978 | Ahlstone | 285/18 |

OTHER PUBLICATIONS

Bear-Loc Brochure, York Industries, Inc., P.O. Box 127, Emigsville, Pa. 17318.

*Primary Examiner*—Richard J. Scanlan, Jr.
*Attorney, Agent, or Firm*—Browning, Bushman, Zamecki & Anderson

[57] ABSTRACT

A connector for subsea wellhead bodies comprises a connector body adapted to be connected to a subsea wellhead body in generally coaxial alignment therewith. Latches carried by the connector body are engageable with the wellhead body to so connect the bodies. An actuator is operatively associated with the latches and longitudinally extendible for extending the latches into such engagement with the wellhead body. A lock assembly is provided for selectively locking the actuator in its longitudinally extended position. The lock assembly comprises inner and outer lock portions, the outer portion telescopically receiving the inner portion with a tight interference fit. The lock portions are oriented generally parallel to the path of movement of the actuator. One of the lock portions is connected to the connector body, while the other is connected to the actuator. Means are provided for selectively introducing pressurized fluid between the inner and outer lock members to forcibly radially separate them and allow relative telescopic movement therebetween.

19 Claims, 5 Drawing Figures

LOCKDOWN MECHANISM FOR WELLHEAD CONNECTOR

CROSS REFERENCE TO RELATED APPLICATION

This is a continuation-in-part of co-pending U.S. patent application Ser. No. 293,281 filed Aug. 17, 1981.

BACKGROUND OF THE INVENTION

The present invention pertains to connectors which are used to connect various other devices to subsea wellheads. The connector may be designed to connect directly to the wellhead, as for mounting a blowout preventer, or it may connect indirectly to the wellhead, as via a flow line. Examples of such indirectly connected devices are: tree cap and re-entry connectors, split tree connectors, flow loop connectors, flow line connectors, and production riser connectors.

Such a connector typically includes an annular main body which is connected in coaxial alignment with the subsurface wellhead or another body in turn connected to the wellhead. The connector body carries some type of latch means which can be extended and retracted, usually by a generally radial movement, for engagement and disengagement with the wellhead so as to connect or disconnect the connector main body thereto. In most such connectors, these latch means are actuated or moved into their radially extended positions for engagement with the wellhead or other body by a longitudinally reciprocable actuator. The actuator may, for example, comprise some type of piston means which directly, or indirectly via another member movable therewith, cams the latches radially inwardly as the piston means is extended in a longitudinal direction. When the piston means is moved in the opposite longitudinal direction, the latches are freed for radially outer movement so that the connector can be removed.

After such an actuator has been extended, to in turn extend the latches and thereby engage the wellhead or other body, it is desirable to mechanically lock the actuator and latches in their extended positions so that hydraulic pressure need not be maintained on the actuator in order to maintain the latching engagement.

In the past, numerous systems have been devised for achieving such mechanical locking. In most cases, the locking assembly would include at least one member movable longitudinally jointly with the actuator with respect to the main body of the connector or an attachment thereto. The adjacent portion of the connector body or attachment would have carried thereon some type of retainer means engagable with the aforementioned movable portion of the locking assembly to mechanically restrain it from subsequent longitudinal movement. Although the retainer means of such an assembly might initially be hydraulically activated, it would be designed to interlock with the movable member, e.g. by opposed shoulders, so that the actuating pressure could be released without releasing the retainer means from engagement with the movable portion of the locking assembly.

Such prior locking assemblies have suffered from several disadvantages. In the first place, the interlocking formations which permitted the retainer portion of the locking assembly to remain in its locking position in the absence of hydraulic pressure would also necessitate some type of mechanical forcing of the retainer means into a retracted position, e.g. by a camming action, when it was desired to remove the connector. Thus, such prior locking devices were susceptible to jamming and other problems, which in turn required expensive and time-comsuming use of divers and/or destruction of at least a part of the connector in order to remove it from the wellhead. As mentioned, such prior devices have included some type of special formation on the movable portion of the locking assembly which formation could be engaged by the retainer means carried by the connector body. Such an engagable formation was necessarily located in some fixed position along the length of the movable portion of the locking assembly. The problem with this arrangement is that, in connecting a connector to a subsea structure such as a wellhead, it is not always possible to predict or accurately control the amount of extension of the latches and actuator which will be permitted. For example, the profile of a wellhead which is designed to mate with connector latches may be effectively altered by wear, corrosion, debris, or the like so that more or less than the ideal amount of latch travel is needed, or indeed possible, for latching of the connector to the wellhead. Since the amount of longitudinal travel of the actuator corresponds to the amount of radial travel of the latches, it is therefore difficult and expensive to attempt to ensure that the engagement formation of the movable portion of the locking assembly, which moves jointly with the actuator of the connector, will be properly aligned with the retainer means when the actuator has moved downwardly as far as possible.

SUMMARY OF THE INVENTION

The present invention contemplates the adaptation of a locking or connection device, known for numerous other uses, into a connector for a subsea wellhead structure to serve as the locking assembly therefor. This locking assembly includes inner and outer lock means. The inner lock means may comprise a cylindrical rod and the outer lock means a surrounding sleeve. These members are arranged generally parallel to the path of movement of the actuator of the connector, one of the members, preferably the inner rod, being connected to the actuator, and the other member, preferably the outer sleeve, being connected to the main body of the connector. The sleeve normally surrounds the rod with a tight interference fit. Means are provided for introducing pressurized fluid between the rod and sleeve to forcibly radially separate the two, specifically by expanding the outer sleeve. This frees the two lock means for relative telescopic movement. Thus, while maintaining the fluid pressure between the rod and sleeve so as to keep them separated, the actuator can be extended to a desired position, e.g. a lower position which corresponds to the latching position of the connector latches. Then, the fluid pressure between the rod and sleeve of the locking assembly is released. The sleeve contracts back into a tight interference fit with the rod, but at a new position along the length of the rod which will have moved longitudinally along with the connector actuator.

Because the means of retaining the rod with respect to the sleeve is an interference fit, rather than some type of interlocking formation, several advantages are achieved. In the first place, there is virtually no chance of jamming or similar malfunctions. On the contrary, if it is desired to release and retrieve the connector, fluid pressure is simply again applied to the space between the rod and sleeve and maintained long enough to retract the connector actuator. The pressure between the rod and sleeve can then be released so that the locking assembly now actively maintains the actuator in its retracted position. Perhaps even more importantly, the rod can be formed with a substantially uniform outer diameter over a substantial portion of its length, and the sleeve can grip the rod at an infinite number of different positions or locations along its length. This greatly simplifies the machining and other production processes for the connector, and also eliminates any problem in locking the connector in its latched condition if, due to deformation of the wellhead body profile, or for any other reason, the amount of extension of the latches and related actuator is more or less than average.

In some embodiments of the invention, one of the lock means is releasably attached to the connector body so as to provide a fail safe and/or manual override system. Thus, if there is loss of fluid pressure for releasing the lock assembly, the one lock means which is normally attached to the connector body can be released to in turn permit operation of the actuator means of the connector, with the entire lock assembly simply retracting jointly with the actuator means. If, in addition to the aforementioned problem, there should be loss of fluid pressure or other means for operating the actuator, a retainer member, which is moved longitudinally in order to release the attachment means, can further be engaged with the lock assembly so that, upon continued longitudinal movement of said retainer member, the entire lock assembly as well as the attached actuator can be forcibly retracted.

Although the releasable attachment means may include interlocking formations, e.g. a radial detent system, it does not reintroduce the problems associated with prior art lock mechanisms because it is engaged or set only prior to running in of the connector. Furthermore, one of said interlocking parts may be adjustable, e.g. with respect to the attached connector body, to take up slack in the detent system after setting or engagement thereof. This in turn provides for a properly tight attachment, without the need for machining of the various interlocking parts to close tolerances.

Accordingly, it is a principal object of the present invention to provide a subsea connector having an improved lock assembly.

Another object of the present invention is to provide such a connector in which the lock assembly operates by virtue of a tight interference fit without the need for abutting shoulders or other specialized interlocking formations.

Still another object of the present invention is to provide an improved method for locking a connector in a desired position.

Yet a further object of the present invention is to provide such an improved lock assembly with means for releasably attaching the lock assembly to the subsea connector to provide a fail safe or override system.

Other objects, features, and advantages of the present invention will be made apparent by the following detailed description of preferred embodiments, the drawings, and the claims.

DETAILED DESCRIPTION

Figure 1:
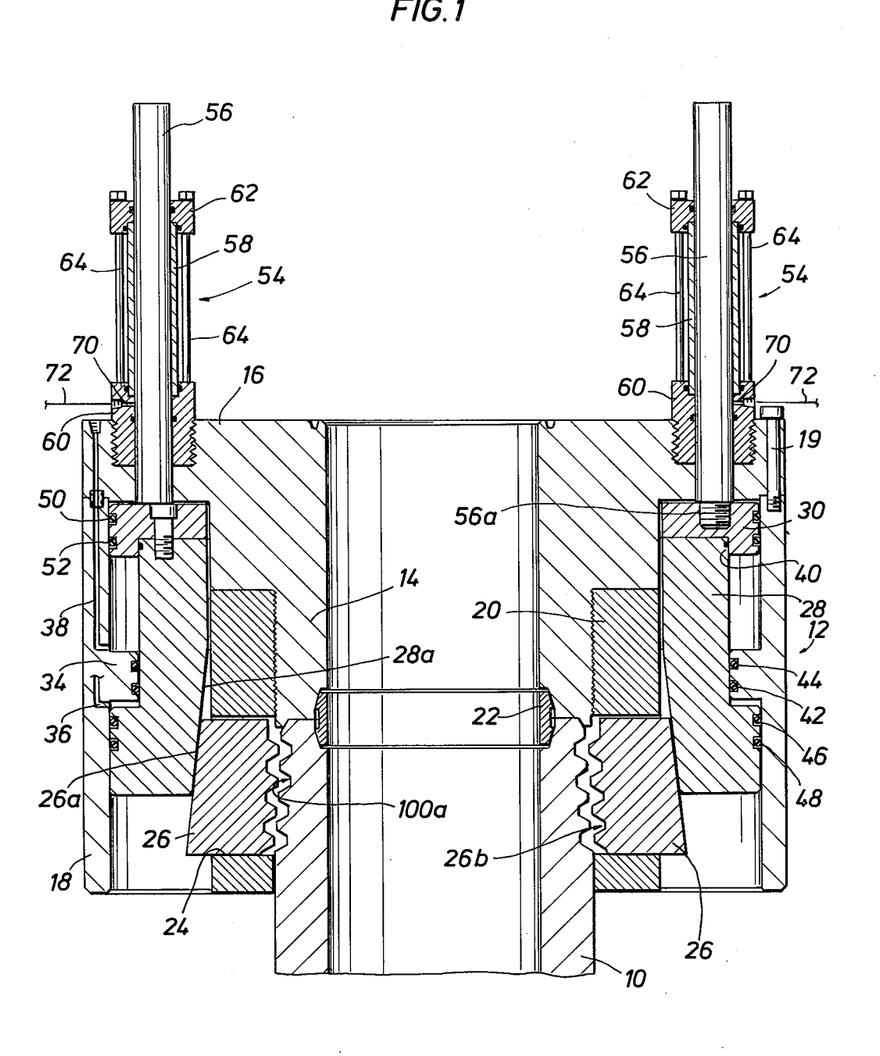
FIG. 1 is a longitudinal cross-sectional view of an improved wellhead connector according to the present invention emplaced on a wellhead, but unlatched.

Referring to FIG. 1, there is shown the upper end of a wellhead 10 and a wellhead connector, generally denoted by the numeral 12. Although the exemplary embodiment shown is adapted to connect directly to a wellhead per se, other types of connectors, such as flow line connectors, may employ substantially identical latch and lock mechanisms. Since all such connectors are ultimately connected to a wellhead, either directly or via intermediate devices such as various types of conduits, they will be construed as generically covered by the term "connectors for connecting to a subsea wellhead." The term "wellhead body" will be broadly construed to mean the wellhead per se or another structure connected to the wellhead.

The wellhead connector 12 has been seated on the wellhead 10, but not yet latched thereto. The wellhead connector 12 comprises a main body including a central tubular portion 14, an upper flange 16 integral with and extending radially outwardly from portion 14, a cage 20 threadedly connected to portion 14 and forming a downward extension thereof, and a sleeve 18 rigidly connected to the outermost extremity of flange 16 by a set of screws, one of which is shown at 19, sleeve 18 extending downwardly from flange 16. As shown, the lower end of portion 14 rests on the upper end of wellhead 10 coaxially therewith and is sealed with respect to wellhead 10 by a seal ring 22.

Cage 20 has a plurality of circumferentially spaced windows 24 opening radially therethrough. In each window 24 there is mounted a latch member 26. In the annular space between central portion 14 of the connector body and its extension 20, on the one hand, and sleeve 18, on the other hand, there is mounted an actuator in the form of an annular piston assembly. The piston assembly is formed by annular members 28 and 30 connected to each other by screws, one of which is shown at 32. Members 28 and 30 are further sealed with respect to each other by a seal 40 so that, in effect, they act as a single piston. The upper portion of lower piston member 28 has a relatively small outer diameter, and this portion is slidingly engaged by a flange 34 extending radially inwardly from sleeve 18. Flange 34 is sealed with respect to piston member 28 by seal rings 42 and 44. The lower portion of piston member 28 has an enlarged outer diameter for slidingly engaging the portion of sleeve 18 below flange 34. Thus, this lower portion of piston member 28 forms a first piston head which is sealed with respect to sleeve 18 by seal rings 46 and 48. Upper piston member 30 also has an enlarged outer diameter with respect to the adjacent or upper portion of piston member 28, so that it forms a second piston head slidingly engaging the portion of sleeve 18 above flange 34 and sealed with respect thereto by seal rings 50 and 52.

A passageway 36 extends through the wellhead connector body (only the lower portion of passageway 36 is shown in FIG. 1) communicating with the space between flange 34 and the lower piston head. It can be seen that, if hydraulic fluid, e.g. from a source controlled from a platform above the wellhead, is urged through passageway 36, piston 28, 30 will be moved downwardly. The lower portion of the inner diameter of piston member 28 has a downwardly and radially outwardly inclined surface 28a. The radially outer surfaces of latches 26 are correspondingly inclined as indicated at 26a. Thus, as piston assembly 28, 30 is moved downwardly, it will cam latches 26 radially inwardly from the position shown in FIG. 1. The upper end of wellhead 10 has coarse grooves 100a formed on its outer diameter, grooves 100a in effect forming a tooth-like profile. The radially inner surfaces 26b of latches 26 have corresponding tooth-like formations which, when body portion 14 is resting on the upper end of wellhead 10 as shown, are aligned with formations 10a. When latches 26 are extended radially inwardly as described above, formations 10a and 26b will be brought into mating engagement, so that the entire wellhead connector 12 will be effectively latched to the wellhead 10.

When it is desired to detach and remove the wellhead connector 12, hydraulic fluid is admitted to the space between flange 34 and upper piston head 30 through a passageway 38 in the wellhead connector body while passageway 36 is vented. This causes piston assembly 28, 30 to move upwardly, thus separating surfaces 28a and 26a, and freeing latches 26 for potential radially outward movement. Then, by simply exerting an upward force on the wellhead connector 12 by a suitable retrieving tool and line, latches 26 can be forced radially outwardly by virtue of the inclination of the tooth-like formations 10a and 26b.

The apparatus thus far described represents a simplified version of only one type of wellhead connector, and it should be understood that the principles of the invention can be applied to numerous other types of wellhead connectors.

Still referring to FIG. 1, the wellhead connector 12 is further provided with a pair of locking assemblies 54 located on diametrically opposite sides of wellhead connector 12, at the upper end thereof. A greater number of locking assemblies can be provided depending on the force requirements. Assemblies 54 can be used to lock actuator or piston assembly 28, 30 in any desired position, but typically, they are used to lock the piston assembly in its uppermost or retracted position as shown in FIG. 1, or in a lower or extended position in which it has cammed latches 26 radially inwardly into engagement with wellhead 10.

Each of the assemblies 54 includes an elongate rod 56 and a sleeve 58 surrounding the rod 56. The assemblies 54 are of a type which can be obtained from York Industries, Inc. of Emigsville, Pa. under the trademark BEAR-LOC. The sleeve 58, though metallic, is radially outwardly expandable by sufficient pressure. Its inner diameter, in a relaxed state, is slightly smaller than the outer diameter of the rod 56, so that when rod 56 is surrounded by sleeve 58 as shown, the two are firmly locked together by a tight interference fit. The rod 56 is of substantially uniform diameter throughout its length, except for its lower end 56a which is threaded into upper piston member 30. The portions of piston member 30 on the left and right hand sides of FIG. 1 are, for convenience, shown in slightly different planes for illustrating, respectively, screw 32 and lower end 56a of one of the rods 56.

Figure 2:
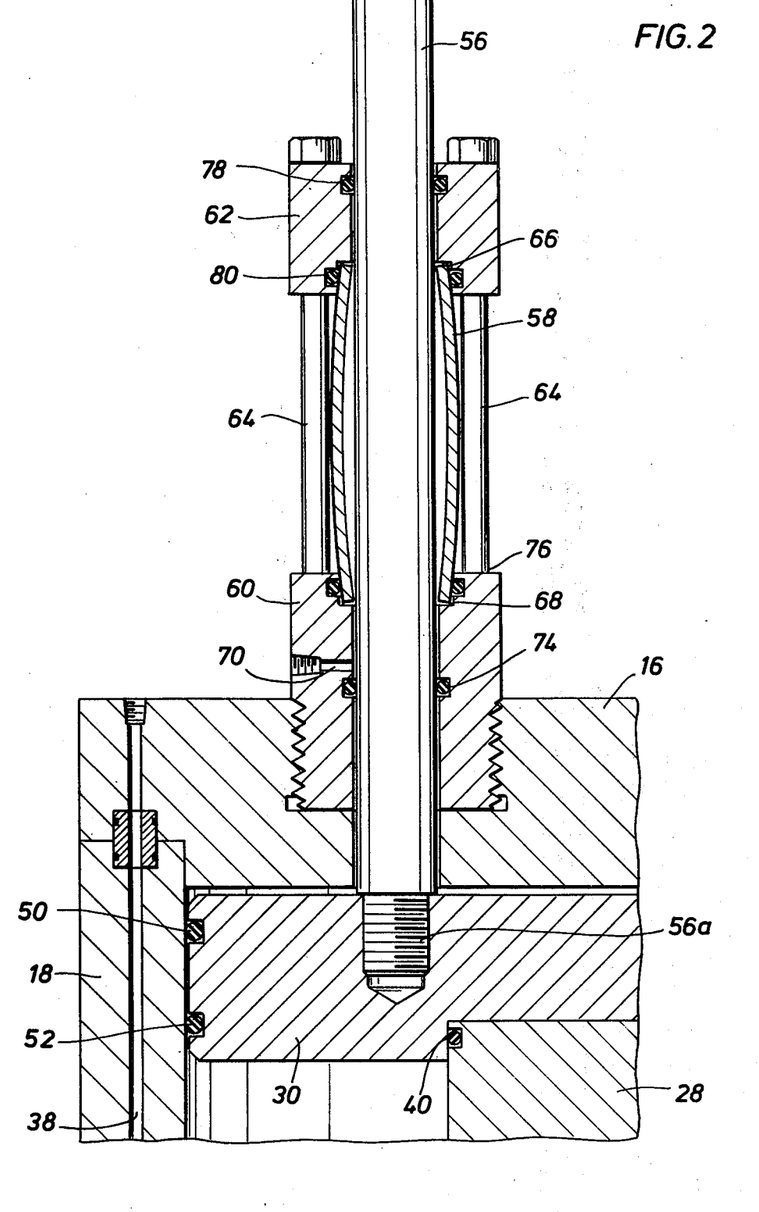
FIG. 2 is an enlarged detailed cross-sectional view of the locking assembly in an unlocked condition, and with the associated wellhead connector actuator still retracted.
Figure 3:
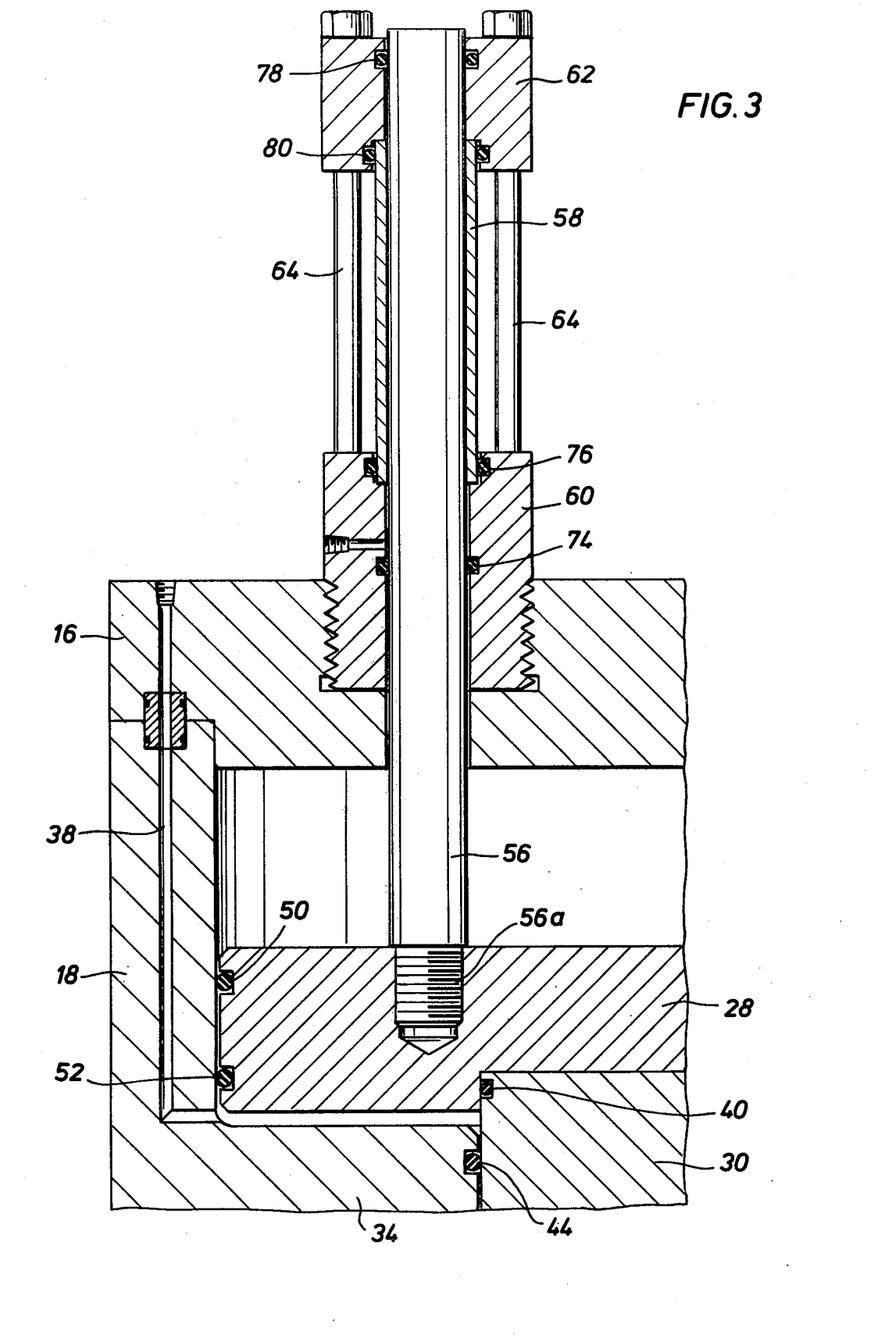
FIG. 3 is a view similar to that of FIG. 2 but showing the actuator extended and locked in place.

Each locking assembly 54 further includes a pair of spaced apart mounting blocks 60 and 62 interconnected by four elongate bolts 64. Lower mounting block 60 is threaded into flange 16 of the wellhead connector body. As best shown in FIGS. 2 and 3, the ends of sleeve 58 axially abut shoulders formed by recesses 66 and 68 in mounting blocks 60 and 62 respectively. Sleeve 58 is effectively locked between mounting blocks 60 and 62, and thus, connected to the wellhead connector body. Block 60 has a radial port 70 therethrough located longitudinally outwardly of the end of sleeve 58. A hydraulic line 72 communicates with port 70 and also with a suitable source of hydraulic fluid (not shown). Flow of fluid through line 72 can be controlled from an operator station above the surface of the water in a manner well known in the art. Referring to FIG. 2, it can be seen that mounting block 60 is sealed with respect to rod 56 longitudinally outwardly of port 70 by seal ring 74, and to sleeve 58 by seal ring 76. Mounting block 62 is similarly sealed to rod 56 and sleeve 58 by seal rings 78 and 80 respectively. However, sleeve 58 is not sealed with respect to rod 56. Accordingly, when pressurized fluid is introduced through line 72 and port 70, it will enter between rod 56 and sleeve 58, radially expanding the latter to provide a separation as shown (exaggerated) in FIG. 2. Then, rod 56 is free to move longitudinally with respect to sleeve 58, and thus, actuator piston assembly 28, 30 is likewise free to move.

Accordingly, by maintaining fluid pressure in the space between rod 56 and sleeve 58 and applying fluid pressure through passageway 36 in the connector body, piston assembly 28, 30 can be lowered and latches 26 extended for engagement for wellhead 10, as described above. After the latches have been properly engaged, the fluid pressure in line 72 and port 70 is released allowing sleeve 58 to contract back upon rod 56 reestablishing the tight interference fit but on a different position on rod 56. This position of the apparatus is shown in FIG. 3. Pressure in passageway 36 can then be relieved, as piston 28, 30 is locked in its extended position by assemblies 54. Piston member 28 in turn holds latches 26 in their extended positions.

Although one or the other of the members 56 and 58 might be provided with surface irregularities, such as serrations, small ridges, or roughened areas, to help establish firm frictional engagement between the two members, the outer diameter of rod 56 is generally uniform throughout its entire length, except for its end portion 56a. The inner diameter of sleeve 58 is likewise generally uniform along its length. The length of rod 56 is at least as long as sleeve 58 plus the length of travel of piston assembly 28, 30. Thus, there is no fixed point longitudinally along rod 56 which must be aligned with sleeve 58 in order to provide for proper locking engagement between those two members. Thus, the locking assembly 54 is particularly well adapted for use in connectors for subsea wellhead bodies, where it is difficult or impossible to regulate the precise amount of longitudinal travel of the piston assembly 28, 30 attached to the movable member 56 of the locking assembly.

Another advantage of the locking assembly 54 is that there is no requirement for mechanical interlocking, e.g. abutment of opposed shoulders or the like, between members 56 and 58. Thus, there is no danger that such interlocking formations would jam or hang up when it is desired to release the locking assembly. On the contrary, it is simply necessary to again apply fluid pressure through line 72 and port 70 to expand sleeve 58, and maintain such pressure while piston 28, 30 is retracted back upwardly to its desired position. Then, the fluid pressure in line 72 and port 70 can be relieved, permitting sleeve 58 to again contract in the position of FIG. 1 to hold the piston 28, 30 in its retracted position.

While one locking assembly 54 has been described above, it should be understood that both locking assemblies are identical, and would be operated simultaneously in the manner described above.

Figure 4:
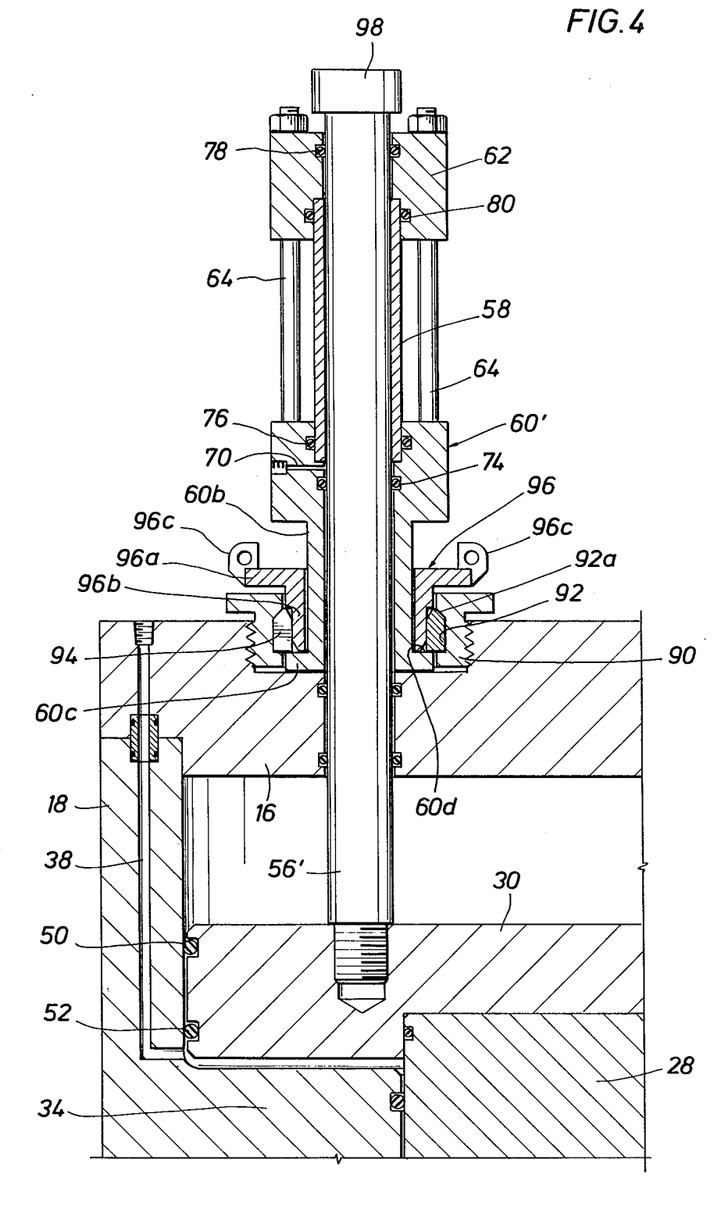
FIG. 4 is an enlarged detailed cross-sectional view of a second embodiment having releasable attachment means shown in attaching position.
Figure 5:
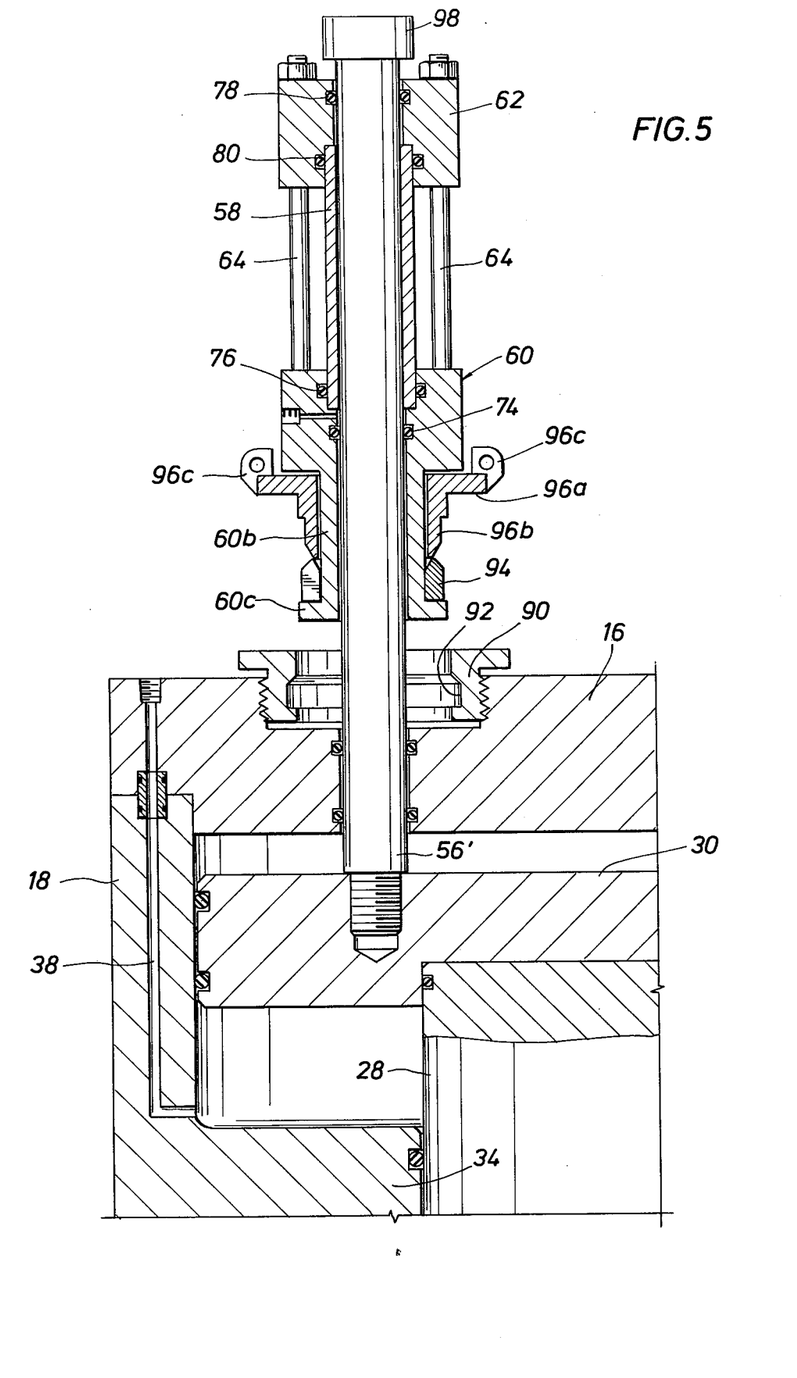
FIG. 5 is a view similar to that of FIG. 4 showing the attachment means in released position.

FIGS. 4 and 5 illustrate a modification or second embodiment of the invention. Like parts of the embodiment of FIGS. 1–3 and the embodiment of FIGS. 4 and 5 have been given like reference numerals. In the embodiment of FIGS. 4 and 5, the outer of the two portions of the lock assembly, i.e. the portion comprising sleeve 58, mounting blocks 60' and 62, and bolts 64 is releasably attached to connector body flange 16 by an attachment assembly which provides a fail safe and override means. The lower of the two mounting blocks 60' is not directly attached to flange 16, but has been modified, as compared with block 60 of the first embodiment, in that it has been lengthened and the lower portion thereof includes a reduced diameter neck 60b and a flange 60c extending radially outwardly from the lower end of neck 60b. A detent-engaging member, in the form of a ring 90 is threaded into the upper end of flange 16. Ring 90 has an internal annular recess 92 adapted to receive detent means in the form of a split spring ring 94. Ring 94 is a contracting spring. Therefore, it is resiliently self-biased radially inwardly, and thus out of recess 92. However, ring 94 can be extended radially outwardly into recess 92 and retained therein by a retainer 96, as shown in FIG. 4. Retainer 96 generally surrounds neck portion 60b of mounting block 60'. Retainer 96 has a lower sleeve-like portion 96b, the lower end of which is bevelled on it radially outer surface. Thus, if retainer 96 is forced longitudinally downwardly, its lower portion 96b can be forced into spring ring 94 expanding the latter radially outwardly into recess 92.

Still referring to FIG. 4, it can be seen that, even when spring ring 94 is fully expanded into recess 92, it still protrudes radially inwardly therefrom so that its lower end can abut flange 60c of mounting block 60'. Thus, the entire outer portion of the lock assembly, including blocks 60' and 62, sleeve 58, and bolt 64, is attached to flange 16 of the connector body. As mentioned, the lower sleeve-like portion 96b of retainer 96, disposed radially inwardly of ring 94, retains the latter in its attaching position as shown in FIG. 4. On the other hand, since ring 94 is resiliently biased radially inwardly, and tends to contract about sleeve-like portion 96b of retainer 96, the frictional engagement therebetween resists upward movement of retainer 96.

The interlocking relationship between the various parts of the attachment assembly is such that, in the attaching position shown in FIG. 4, ring 94 is effectively sandwiched between the generally downwardly facing upper surface 92a of recess 92 and the upwardly facing top surface 60d of flange 60c. Accordingly, in order to minimize the need for machining recess 92 to close tolerances, the recess can be oversized, and after the parts have been assembled generally in the positions shown in FIG. 4, ring 90 can be threaded deeper into flange 16, bringing surfaces 92a and 60d closer together, until all slack is taken up and ring 94 is tightly engaged between those two surfaces.

If, due to some mishap or malfunction, fluid pressure is not available to expand sleeve 58 when it is desired to release the lock assembly and retract the connector actuator 28, 30, the attachment assembly 90, 94, 96 can be released thereby detaching the outer portion of the lock assembly from the connector body. More specifically retainer 96 has a radial flange 96a extending outwardly from the upper end of its lower sleeve-like portion 96b. Flange 96a is provided with lugs 96c which may be engaged by suitable tools to forcibly pull retainer 96 upwardly, withdrawing it from the interior of spring ring 94. Spring ring 94 will then contract radially inwardly into the area about neck 69b formerly occupied by sleeve 96b, so that it completely clears recess 92. At this point, the outer portion of the locking assembly is no longer attached to the connector body, so that the entire locking assembly can be moved upwardly along with the wellhead actuator 28, 30, thereby permitting retraction of the latter as shown in FIG. 5. Furthermore, upon upward movement of retainer 96, its flange 96a will abut the shoulder formed between the upper portion of mounting block 60' and its reduced diameter neck 60b. Accordingly, if all hydraulic power should be lost, so that wellhead actuator 28, 30 cannot be retracted in the normal manner, retainer 96 can be urged further upwardly to act as an override. In particular since retainer 96 abuts mounting block 60', and sleeve 58 of the outer portion of the lock assembly is tightly engaged about the inner portion or rod 56', and since rod 56' is in turn connected to member 30 of the connector actuator, pulling upwardly on retainer 96 will raise the entire locking assembly and the connected actuator 28, 30. a stop nut 98 is fixed to the upper end of rod 56'. Accordingly, if during a manual override operation, sleeve 58 begins to slide on rod 56', such relative movement between the inner and outer portions of the locking assembly will eventually be stopped when upper mounting block 62 abuts nut 98. Then the manual override operation can be completed in the manner described above. It should be noted that, even if ring 94 were not a contracting spring, it would be forced inwardly, upon an upward pull on block 60' via retainer 96, by the mating bevelled surfaces at 92a.

The above description and related drawings represent a more or less simplified version of a typical wellhead connector. It should be understood that the connector 12 could include various other features well known in the art and that the locking assemblies could likewise include additional features, such as an auxiliary hydraulic port extending through mounting block 62, wiper seals to engage the rod 56 longitudinally outwardly of the mounting blocks, and other features. It should also be understood that numerous other modifications of the embodiments shown and described above can be made within the spirit of the invention. For example, the locking assemblies, rather than being mounted directly above the connector body flange 16, could be mounted outboard of that flange, and connected to piston assembly 28, 30 by a yoke-like arrangement. Numerous other modifications will suggest themselves to those of skill in the art. Accordingly, it is intended that the scope of the present invention be limited only by the claims which follow.

I claim:

1. A connector for connecting to a subsea wellhead comprising:

a connector body adapted to be connected to a subsea wellhead body in generally coaxial alignment therewith;

latch means carried by said connector body and engageable with said wellhead body to so connect said connector body;

actuator means operatively associated with said latch means and longitudinally extendable for extending said latch means into such engagement with said wellhead body;

a lock assembly, for selectively locking said actuator means in its longitudinally extended position, comprising inner and outer lock means, said outer lock means telescopically receiving said inner lock means with a tight interference fit, said lock means being oriented generally parallel to the path of movement of said actuator means, one of said lock means being connected to said connector body and the other of said lock means being connected to said actuator means, and means for selectively introducing pressurized fluid between said inner and outer lock means to forcibly radially separate said lock means and allow relative telescopic movement therebetween; and attachment means releasably attaching said one lock means to said connector body, said attachment means comprising detent means having an attaching position and a releasing position with respect to said one lock means, and retainer means engageable with said detent means to retain said detent means in said attaching position.

2. The apparatus of claim 1 wherein said outer lock means comprises an expandable metal sleeve connected to said connector body, and wherein said inner lock means comprises an elongate rod connected to said actuator means.

3. The apparatus of claim 2 wherein said rod has a generally uniform outer diameter along a portion of its length substantially longer than the length of said sleeve.

4. The apparatus of claim 3 wherein the length of said uniform outer diameter portion of said rod is at least equal to the length of said sleeve plus the stroke length of said actuator means.

5. The apparatus of claim 3 wherein said outer lock means further includes a pair of mounting blocks surrounding respective opposite ends of said sleeve and sealed with respect to said sleeve and said rod, said means for introducing fluid comprising port means in at least one of said mounting blocks.

6. The apparatus of claim 3 including a plurality of such lock assemblies circumferentially spaced about said connector body.

7. The apparatus of claim 3 wherein said actuator means comprises longitudinally extendible and retractable piston means, said latch means comprising a plurality of circumferentially spaced latch members generally radially inwardly extendible, upon longitudinal extension of said piston means, for engagement with said wellhead.

8. The apparatus of claim 1 wherein said detent means is resiliently biased to said releasing position.

9. The apparatus of claim 8 wherein said attachment means further comprises detent-engaging means on said connector body engagable with said detent means in said attaching position whereby said detent means interlocks said one lock means and said connector body.

10. The apparatus of claim 9 wherein said retainer means is forcibly releasable from so engaging said detent means to thereby release said attachment means.

11. The apparatus of claim 10 wherein said retainer means is further engagable with said one lock means as an override for forcibly retracting said one lock means.

12. The apparatus of claim 11 further comprising stop means cooperative between said lock means for limiting relative longitudinal movement therebetween to permit joint retraction of said lock means by said override.

13. The apparatus of claim 11 wherein said detent-engaging means defines generally radial recess means, said detent means in said attaching position extending into said recess means but partially radially protruding therefrom so as to longitudinally abut said one lock means.

14. The apparatus of claim 13 wherein said retainer means so engages said detent means by radial abutment therewith, and is so releasable from said detent means and engagable with said one lock means by longitudinal movement.

15. The apparatus of claim 13 wherein said recess means and said one lock means define respective generally oppositely longitudinal facing surfaces for engagement with opposite ends of said detent means, and wherein said detent-engaging means is longitudinally adjustably carried on said connector body to vary the distance between said surfaces.

16. The apparatus of claim 15 wherein said one lock means is said outer lock means, said surface of said one lock means being defined by a radial projection thereon.

17. The apparatus of claim 15 wherein said detent-engaging means is threadedly connected to said connector body.

18. The apparatus of claim 8 wherein said detent means is a self-biasing, contracting split ring.

19. The apparatus of claim 1 wherein said attachment means comprises a plurality of interlocking parts, one of said parts being adjustably connected to said connector body to take up slack between said parts.

* * * * *